(12) United States Patent
Rowe

(10) Patent No.: US 7,837,421 B1
(45) Date of Patent: Nov. 23, 2010

(54) TIE-DOWN MECHANISM

(76) Inventor: Ronny Joe Rowe, 2907 Richland Ave., Louisville, KY (US) 40220

( * ) Notice: Subject to any disclaimer, the term of this patent is extended or adjusted under 35 U.S.C. 154(b) by 312 days.

(21) Appl. No.: 12/207,061

(22) Filed: Sep. 9, 2008

Related U.S. Application Data

(60) Provisional application No. 60/972,362, filed on Sep. 14, 2008.

(51) Int. Cl.
*B60P 7/08* (2006.01)

(52) U.S. Cl. .............................. 410/34; 410/97; 410/100

(58) Field of Classification Search .................... 410/34, 410/36, 42, 96, 97, 100, 117, 118; 206/443, 206/592; 24/712, 713.3, 713.6; 224/403, 224/534, 318, 328; 138/96 R
See application file for complete search history.

(56) References Cited

U.S. PATENT DOCUMENTS

| | | | |
|---|---|---|---|
| 4,316,688 A | 2/1982 | Roskelley | |
| 4,979,776 A | 12/1990 | Schweickert | |
| 5,553,981 A | 9/1996 | Braden | |
| 6,129,490 A | 10/2000 | Erskine et al. | |
| 6,527,487 B2 | 3/2003 | Adams | |
| 6,695,556 B2 | 2/2004 | Addy | |
| 7,217,074 B1 * | 5/2007 | Huber | 410/118 |

* cited by examiner

*Primary Examiner*—Stephen Gordon
(74) *Attorney, Agent, or Firm*—Theresa Fritz Camoriano; Camoriano and Associates

(57) ABSTRACT

A tie-down arrangement uses a draw-string bag to provide securement to a wide variety of loads.

1 Claim, 3 Drawing Sheets

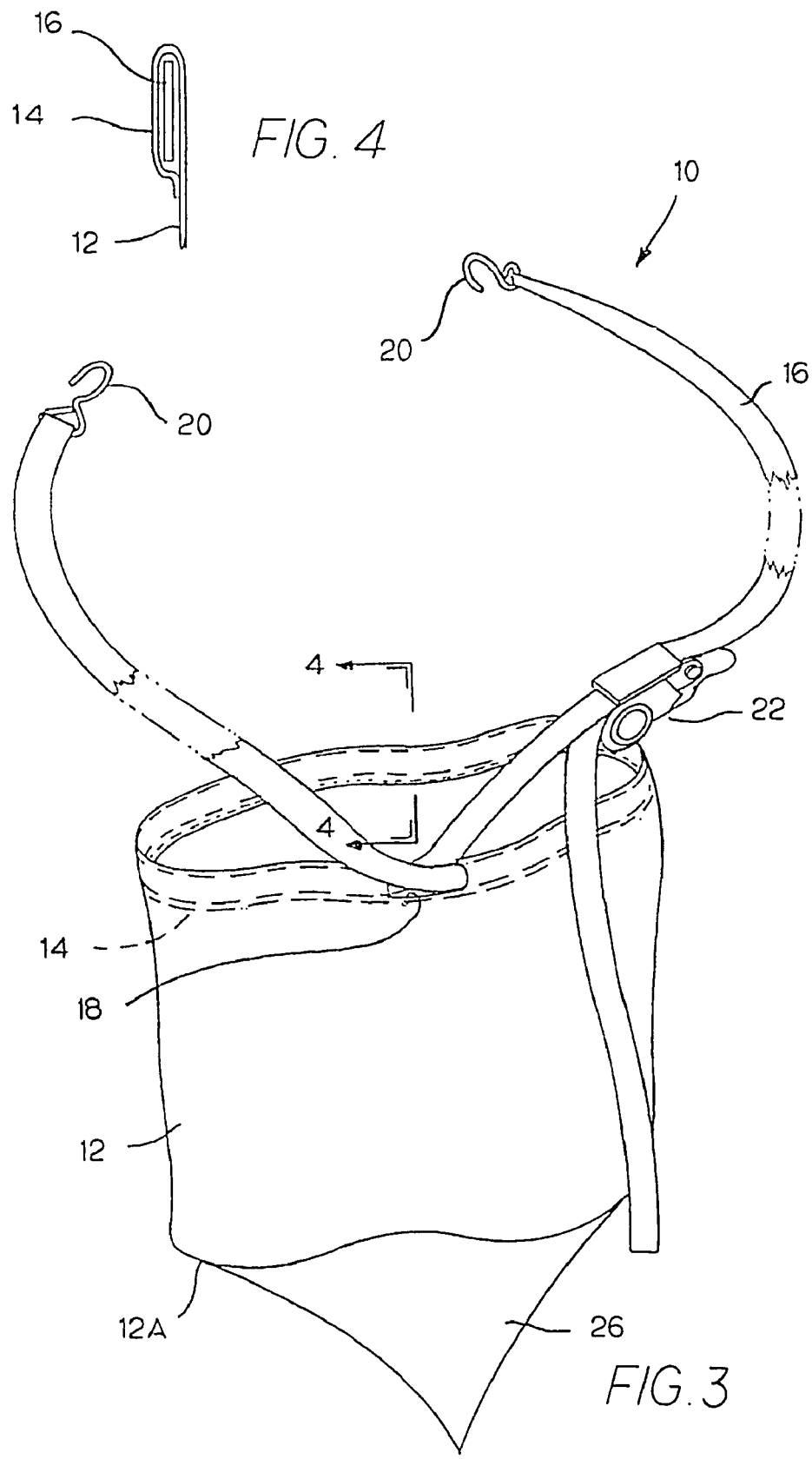

TIE-DOWN MECHANISM

This application claims priority from U.S. Provisional Application Ser. No. 60/972,362 filed Sep. 14, 2007, which is hereby incorporated herein by reference.

BACKGROUND

The present invention relates to a tie-down mechanism for securing a variety of loads to a variety of different types of bases such as beds of pick-up trucks or other vehicles.

BRIEF DESCRIPTION OF THE DRAWINGS

FIG. 3 is a perspective view of the tie-down mechanism of FIG. 1;

FIG. 4 is a broken-away section view along line 4-4 of FIG. 3; and

DESCRIPTION

Figure 1:
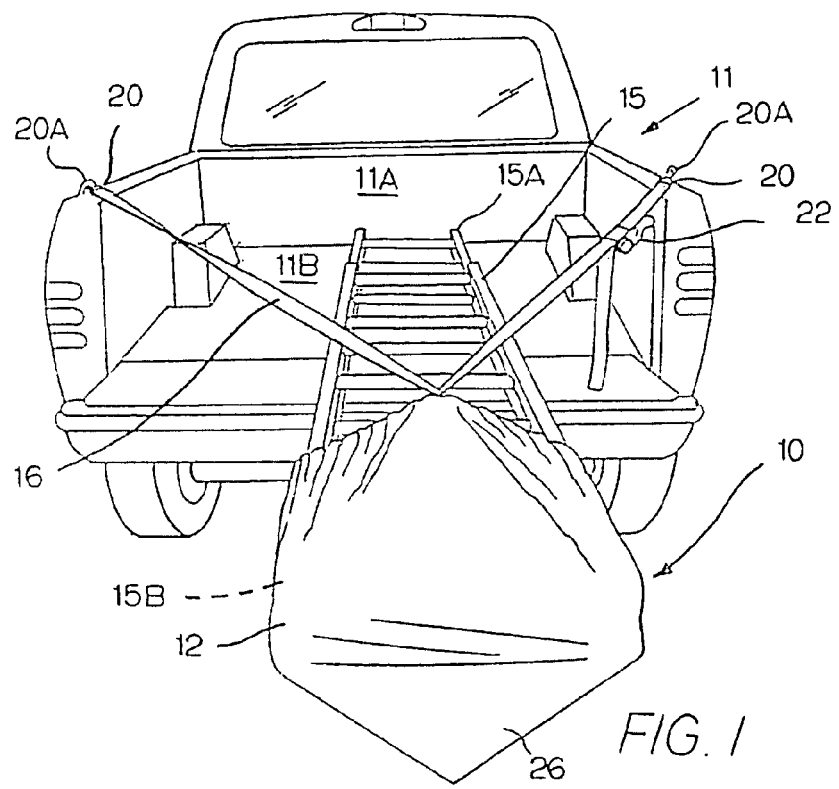
FIG. 1 is a perspective, rear view of a tie-down mechanism being used to secure a ladder on a truck.
Figure 2:
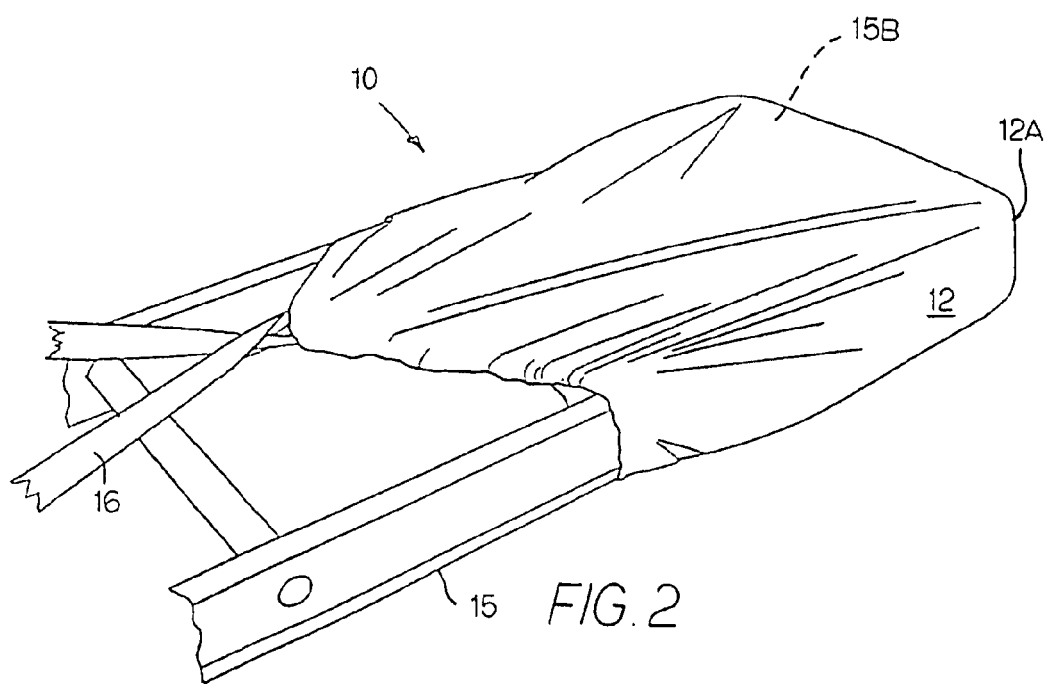
FIG. 2 an enlarged side perspective view of the rear-most portion of the tie-down mechanism and ladder of FIG. 1.
Figure 5:
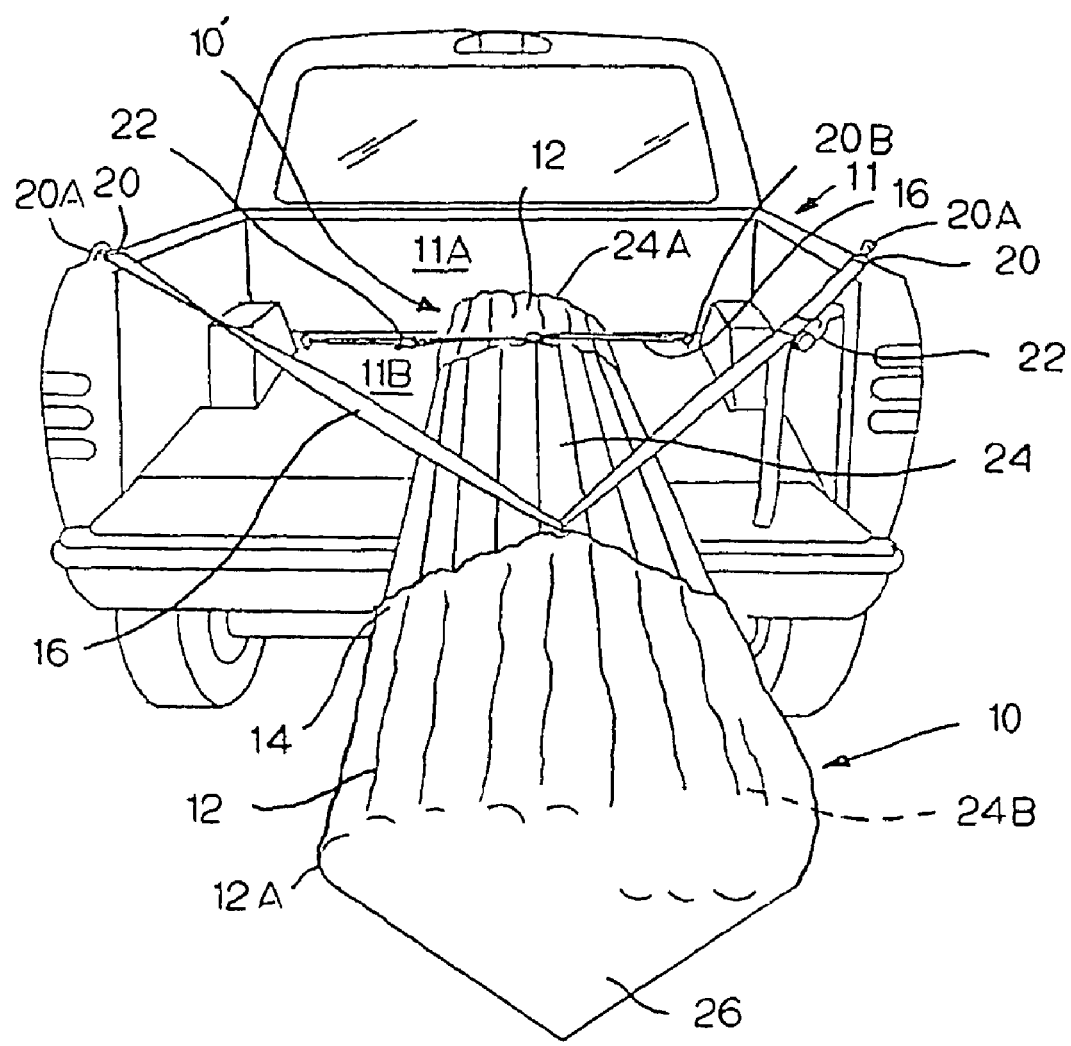
FIG. 5 is a perspective view of two tie-down mechanisms, similar to that of FIG. 1, but being used to secure a load of loose items, such as a load of piping or a load of lumber onto a truck bed.

FIGS. 1-5 show a tie-down mechanism 10. In FIGS. 1 and 2, that tie-down mechanism 10 is being used to secure a ladder 15 onto a truck 11. In FIG. 5, two of the tie-down mechanisms 10, 10' are being used to secure a group of loose items, such as pipes or lumber 24 to a truck 11. Of course, the tie-down mechanism 10 may be used to secure a variety of loads to a variety of different types of bases in addition to trucks or other vehicles.

The tie-down mechanism 10 includes a draw-string bag 12, with a casing 14 (See FIG. 3) at the top, which receives a draw-string cord 16. The cord 16 enters the casing 14 through an opening 18, extends around the bag 12 within the casing 14, and then exits through the opening 18. The two ends of the cord 16 cross at the opening 18 and then extend to their respective hooks 20, with one hook 20 at each end of the cord 16. One end of the cord 16 includes a tightening mechanism 22, which in this embodiment is a ratchet-type winch mechanism, seen best in FIG. 3, of the type that is commonly used on tie-down straps. The tightening mechanism 22 is used to shorten the effective length of the cord 16.

In order to use this tie-down mechanism 10, the load (in FIGS. 1 and 2 the ladder 15) is placed on the truck bed in a central location, with a first end 15A of the load 15 abutting the front end 11A of the truck bed 11B and a free end 15B of the load 15 extending out beyond the truck bed. The bag 12 is placed over the free end 15B of the load 15, and the cord 16, which in this case is a flat nylon strap, is crossed and pulled tight to cinch around the perimeter of the load 15. Then the hooks 20 are hooked into eyes 20A on the truck (or on any other secure anchoring point of the base), and then the tightening mechanism 22 is tightened to pull the ladder 15 forward and to provide a tension on the cord 16 that tends to lift the free end 15B of the load 15. It should be noted that the eyes 20A are located forward of the bag 12 and at a higher elevation than the truck bed 11B so that tightening the mechanism 22 pulls the load 15 forward and up. Then the tightening mechanism 22 is locked, leaving the load 15 securely tied down to the truck 11.

While a ladder 15 was used as a load in FIGS. 1 and 2, this tie-down mechanism 10 can be used for many different types of loads. As shown in FIG. 5, it is particularly well-suited for loose loads 24 of materials such as lumber, pipes, and other similar types of loads. When the cord 16 is pulled tightly to cinch around the perimeter of the load 24, it pulls the lumber, pipes, or other materials together laterally, creating friction between the pieces so they function as a single piece rather than sliding and shifting relative to each other. At the same time, the bottom end 12A of the bag 12 provides an end stop on the free ends of those pieces, thus controlling the lengthwise motion of the load 24.

As with the example of the ladder of FIGS. 1 and 2, when the tightening mechanism 22 is tightened, it causes the bottom end 12A of the bag 12 to pull the load 24 forward, so the first end 24A of the load 24 presses against the front 11A of the truck bed. Thus, the load is compressed laterally by the cinching at the casing 14 (as well as by the sides of the bag 12), is wedged lengthwise between the bottom 12A of the bag 12 and the front 11A of the truck bed 11B, and is prevented from shifting laterally by the cord 16 which is hooked into the eyes 20A and is pulling tightly. The left end hook 20 of the cord 16 is pulling the rear end 24B of the load 24 toward the left as well as upwardly and forwardly, and the right end hook 20 of the cord 16 is pulling the rear end 24B of the load 24 toward the right as well as upwardly and forwardly. In this manner, what otherwise would be a loose pile of different pieces of material functions as a single unit, secured to the truck 11.

A second tie-down mechanism may be used at the front end of the load, if desired, as shown in FIG. 5.

FIG. 5 shows an identical, second tie-down mechanism 10' cinched around the front end 24A of the load 24. This front tie-down mechanism 10' is installed such that the first, or front, end 24A of the load 24 is inside the bag 12 of this front tie-down mechanism 10'. The load 24 and the front tie-down mechanism 10' are then placed in the truck bed 11B with the first end 24A of the load 24 (and the front tie-down mechanism 10') abutting the front end 11A of the truck bed 11B and the free end 24B of the load 24 extending out beyond the truck bed 11B.

The hooks 20 of the front tie-down mechanism 10' are secured to eyes 20B on the front end of the floor of the truck bed 11B. The eyes 20B preferably are located at or forward of the casing 14 of the front bag 12, so the cord 16 does not pull the front end of the load rearwardly. Thus, the front tie-down mechanism 10' pulls the front end 24A of the load 24 down against the floor 11B of the truck bed, with the left end of the cord 16 pulling the load to the left and the right end of the cord 16 pulling the load to the right to secure the front end of the load so it does not lift up or shift to the left or right. The rear tie-down mechanism 10 is then installed as was described earlier.

As shown most clearly in FIG. 3, the tie-down mechanism 10 may also include a flag 26 projecting from the bottom of the bag 12. The flag 26 provides a visual indicator of the position of the free end 15B, 24B of the load 15, 24.

The bag 12 may be made of a variety of materials. A bag made of a heavy duty woven nylon material has been tested and worked well. However, it is not required that the bag be solid. If the bag has openings, it is preferable that any openings not be large enough to allow the product(s) being secured to fit through, at least at the bottom end 12A of the bag 12, so that the bottom end 12A of the bag 12 is functionally closed from the perspective of the load that is being secured. Also, the casing 14 need not be solid. For example, it could be in the form of loops, or rings, secured to the bag, defining a path for the draw-string cord 16 that extends around the perimeter of the bag 12.

The diameter of the bag 12 should be large enough to fit around the free end 24B of the load 24. The bag 12 should be long enough to enclose the ends of all the pieces in the load 24 so that the casing 14 cinches around all the pieces in the load 24 and provides good enclosure for the free end 24A of the load 24. In this embodiment, the bag 12 has a rectangular shape when laid flat, and it is at least half as long (from the bottom 12A of the bag 12 to the casing 14) as it is wide (with the width of the bag being half of the circumference of the bag at the casing 14). Some dimensions of bags that have been used include a bag that is twenty inches wide and twenty-seven inches long, and another bag that is three feet wide and twenty-six inches long. The length (or height) of the bag preferably is at least twenty inches and more preferably at least twenty-four inches in order to ensure that it securely covers the end of the load. The cord 16 length that has been used is fifteen feet, but a cord (or cable) a bit longer, such as twenty feet or greater, would be more versatile. The cable length that is needed depends primarily upon the dimensions of the truck or other base onto which the load is being secured and the positions of the eyes or other anchoring devices onto which the cable is to be secured.

It will be obvious to those skilled in the art that modifications may be made to the embodiments described above without departing from the scope of the present invention.

What is claimed is:

1. A method for tying a load down to a base, comprising the steps of:
   placing a draw-string bag over one end of the load;
   crossing ends of a draw-string cord and tightening the draw-string cord;
   securing the ends of the draw-string cord to the base; and
   reducing an effective length of the draw-string cord.

* * * * *